United States Patent
Schwartz et al.

(10) Patent No.: US 12,261,459 B2
(45) Date of Patent: Mar. 25, 2025

(54) WIRELESS POWER SYSTEMS WITH FOREIGN OBJECT DETECTION

(71) Applicant: Apple Inc., Cupertino, CA (US)

(72) Inventors: Adam L. Schwartz, Redwood City, CA (US); Niloofar Rashidi Mehrabadi, Santa Clara, CA (US); Hossein Sepahvand, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/327,750

(22) Filed: Jun. 1, 2023

(65) Prior Publication Data

US 2023/0307962 A1 Sep. 28, 2023

Related U.S. Application Data

(63) Continuation of application No. 17/109,793, filed on Dec. 2, 2020, now abandoned.

(Continued)

(51) Int. Cl.
*H02J 50/60* (2016.01)
*H02J 50/12* (2016.01)
(Continued)

(52) U.S. Cl.
CPC .............. *H02J 50/60* (2016.02); *H02J 50/12* (2016.02); *H02J 50/70* (2016.02); *H02J 50/80* (2016.02)

(58) Field of Classification Search
None
See application file for complete search history.

(56) References Cited

U.S. PATENT DOCUMENTS

| | | |
|---|---|---|
| 9,106,083 B2 | 8/2015 | Partovi |
| 9,410,823 B2 | 8/2016 | Widmer et al. |
| | (Continued) | |

FOREIGN PATENT DOCUMENTS

| | | |
|---|---|---|
| DE | 202016100924 U1 | 5/2017 |
| EP | 3393009 A1 | 10/2018 |
| | (Continued) | |

OTHER PUBLICATIONS

Notice of Preliminary Amendment for Korean Patent Application No. 10-2023-7021215 dated Feb. 20, 2024; 7 pgs.

(Continued)

*Primary Examiner* — Daniel Kessie
(74) *Attorney, Agent, or Firm* — FLETCHER YODER PC

(57) ABSTRACT

A wireless power system has a wireless power transmitting device and a wireless power receiving device. The wireless power transmitting device uses a wireless power transmitting coil to transmit wireless power signals to the wireless power receiving device. The wireless power transmitting device determines whether an external object is present. The external object may be a foreign object such as a coin or paperclip or may be a wireless power receiving device. External objects are detected using quality-factor measurements. Wireless communications are used to discriminate between foreign objects and wireless power receiving devices. Quality factor measurements may be compensated for aging and temperature effects using temperature measurements and compensation factors based on frequency and measured resistance.

29 Claims, 9 Drawing Sheets

Related U.S. Application Data

(60) Provisional application No. 63/012,813, filed on Apr. 20, 2020, provisional application No. 62/943,043, filed on Dec. 3, 2019.

(51) Int. Cl.
*H02J 50/70* (2016.01)
*H02J 50/80* (2016.01)

(56) References Cited

U.S. PATENT DOCUMENTS

| | | |
|---|---|---|
| 9,450,648 B2 | 9/2016 | Bastami |
| 9,530,558 B2 | 12/2016 | Nakano et al. |
| 9,997,929 B2 | 6/2018 | Yamamoto et al. |
| 10,371,848 B2 | 8/2019 | Roy et al. |
| 10,530,188 B2 | 1/2020 | Baarman et al. |
| 2005/0024165 A1* | 2/2005 | Hsu .................. H03H 3/0072 |
| | | 333/186 |
| 2013/0076153 A1 | 3/2013 | Murayama et al. |
| 2013/0162054 A1 | 6/2013 | Komiyama |
| 2014/0015522 A1* | 1/2014 | Widmer .................. H02J 50/12 |
| | | 324/239 |
| 2014/0044293 A1 | 2/2014 | Ganem et al. |
| 2015/0323694 A1 | 11/2015 | Roy et al. |
| 2016/0329751 A1 | 11/2016 | Mach et al. |
| 2017/0010307 A1 | 1/2017 | Komiyama |
| 2018/0219421 A1 | 8/2018 | Yang et al. |
| 2018/0233954 A1* | 8/2018 | Yang .................. H02J 50/12 |
| 2018/0241257 A1 | 8/2018 | Muratov et al. |
| 2019/0131826 A1 | 5/2019 | Park |
| 2019/0165518 A1 | 5/2019 | Hsu et al. |
| 2019/0165618 A1 | 5/2019 | Chen et al. |
| 2019/0190320 A1 | 6/2019 | Park |
| 2019/0296591 A1 | 9/2019 | Park |
| 2019/0319494 A1 | 10/2019 | Park et al. |
| 2019/0319495 A1 | 10/2019 | Park |
| 2020/0083754 A1 | 3/2020 | Tian et al. |
| 2020/0200937 A1* | 6/2020 | Widmer ................. B60L 53/122 |
| 2020/0343765 A1* | 10/2020 | Kwon .................... H02J 50/12 |
| 2021/0135506 A1 | 5/2021 | Muratov |

FOREIGN PATENT DOCUMENTS

| | | | |
|---|---|---|---|
| JP | 2017022999 A | 1/2017 | |
| KR | 10-2017-0118571 A | 10/2017 | |
| KR | 10-20180010796 A | 1/2018 | |
| KR | 10-2018-0022513 A | 3/2018 | |
| WO | 2016091764 A1 | 6/2016 | |
| WO | 2017174380 A1 | 10/2017 | |
| WO | 2019229229 A1 | 12/2019 | |
| WO | WO-2020015746 A1 * | 1/2020 | ............. H02J 50/12 |
| WO | 2020101767 A1 | 5/2020 | |

OTHER PUBLICATIONS

Notice of Allowance for Korean Patent Application No. 10-2022-7018669 dated Feb. 20, 2024; 6 pgs.

Office Action for German Patent Application No. 11 2020 007 898.1, dated Oct. 21, 2024; 5 pgs.

* cited by examiner $$V(j\omega) = (j\omega L + R) I(j\omega)$$

$$a = \left|\frac{V(j\omega)}{I(j\omega)}\right|^2 = \omega^2 L^2 + R^2$$

$$\theta = \angle\left(\frac{V(j\omega)}{I(j\omega)}\right) = \tan^{-1}\frac{\omega L}{R}$$

$$Q \equiv \frac{\omega L}{R} = \tan(\theta)$$

$$L = \frac{\sqrt{\frac{aQ^2}{Q^2+1}}}{\omega}$$

$$R = \sqrt{\frac{a}{Q^2+1}}$$

$$\text{Qcomp} \triangleq Q'\left(\frac{\omega_0}{\omega}\right)\left(\frac{1+\kappa_R \Delta T}{1+\kappa_L \Delta T}\right)\left(\frac{R^{\text{meas}}}{R_{DC,0}+R_{AC}(\Delta\omega)/(1+\eta\Delta\omega)}\right)$$

*FIG. 6*

WIRELESS POWER SYSTEMS WITH FOREIGN OBJECT DETECTION

This application is a continuation of patent application Ser. No. 17/109,793, filed Dec. 2, 2020, which claims the benefit of provisional patent application No. 62/943,043, filed Dec. 3, 2019 and provisional patent application No. 63/012,813, filed Apr. 20, 2020, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

It is desirable to understand how much power that is transmitted by a wireless power transmitting device is, or is not, received by the wireless power receiving device.

In some embodiments, the wireless power transmitting device determines whether an external object is present in the vicinity of the wireless power transmitting coil. The external object may be a foreign object such as a coin or paperclip or may be a wireless power receiving device. If a foreign object is detected, suitable action may be taken such as forgoing wireless power transmission.

In some embodiments, external objects can be detected using quality-factor measurements. Current quality-factor measurements are compared to a baseline quality measurement to determine whether an external object is present. Wireless communications can be used to discriminate between foreign objects and wireless power receiving devices.

Quality-factor measurements may be made by applying an impulse to the wireless power transmitting coil and measuring a decay envelope associated with an impulse response in the coil or by measuring the impedance of the wireless power transmitting coil directly and determining the current quality factor from the measured impedance. Quality factor measurements can be compensated for aging and temperature effects using temperature measurements and compensation factors based on frequency and coil resistance measurements.

BRIEF DESCRIPTION OF THE DRAWINGS

FIG. 6 is an equation showing compensation factors that may be applied to a current quality factor measurement to determine a compensated quality-factor value in accordance with an embodiment.

DETAILED DESCRIPTION

A wireless power system includes a wireless power transmitting device such as a wireless charging mat. The wireless power transmitting device wirelessly transmits power to a wireless power receiving device. The wireless power receiving device may be a device such as a wrist watch, cellular telephone, tablet computer, laptop computer, or other electronic equipment. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

If a foreign object such as a paperclip, coin, or other metallic object is present near the wireless power transmitting coil of the wireless power transmitting device, there may be a risk of eddy current generation in the foreign object that could elevate the temperature of the foreign object. To determine whether a foreign object such as a paperclip or coin is present in the vicinity of the wireless power transmitting device, the wireless power transmitting device measures the quality factor of the wireless power transmitting coil and determines whether the quality factor has been affected by the presence of a foreign object. By detecting whether foreign objects are present, suitable action can be taken (e.g., the wireless power transmitting device may forgo wireless power transfer operations whenever a foreign object is detected).

Figure 1:
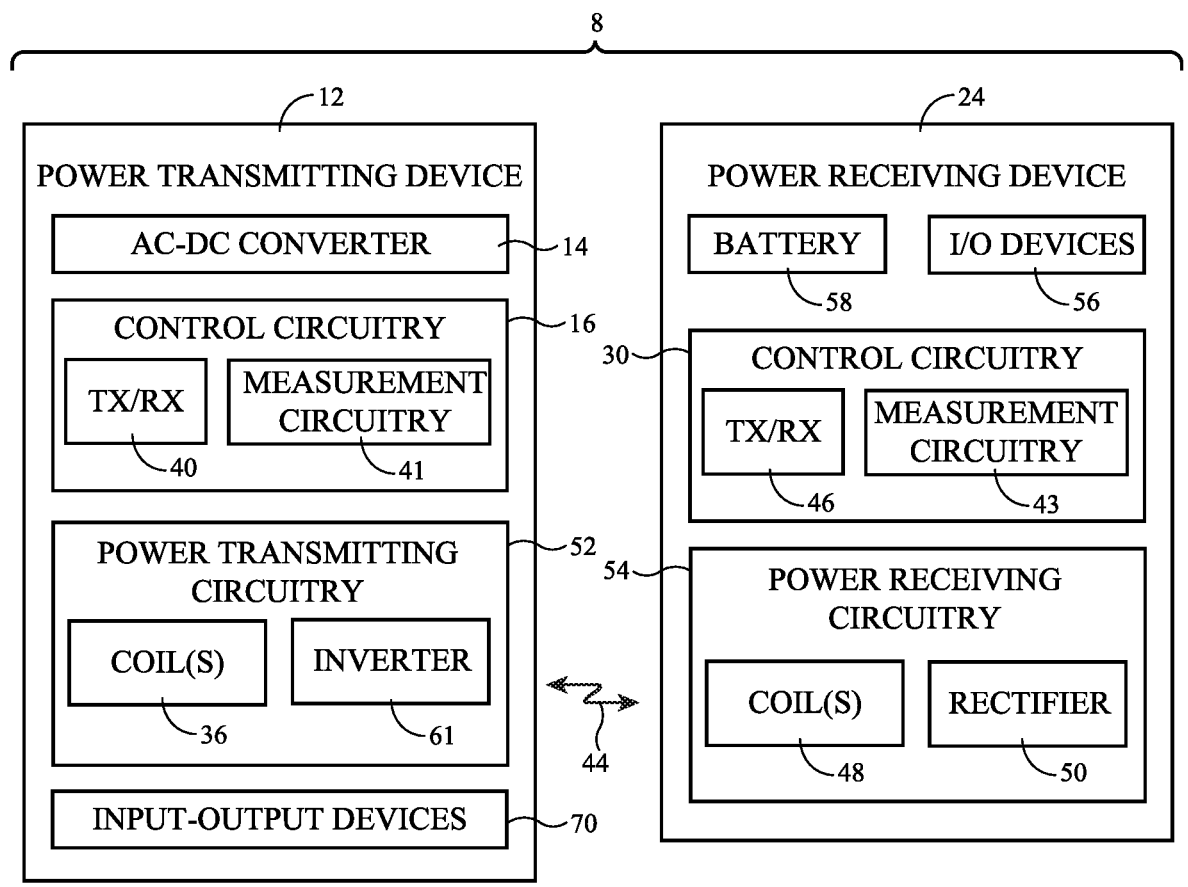
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects and perform other tasks, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may have one or more input-output devices 70 (e.g., input devices and/or output devices of the type described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, battery states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect whether external objects are present on the charging surface of the housing of device 12 (e.g., to detect objects on the top of a charging mat or, if desired, to detect objects adjacent to the coupling surface of a charging puck). The housing of device 12 may have polymer walls, walls of other dielectric, metal structures, fabric, and/or other housing wall structures that enclose coils 36 and other circuitry of device 12. The charging surface may be a planer outer surface of the upper housing wall of device 12 or an outer surface having other shapes (e.g., concave, convex, etc.). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 and/or on other coils such as optional foreign object detection coils in device 12 to determine whether any devices 24 are present on device 12.

In an illustrative arrangement, measurement circuitry 41 of control circuitry 16 contains signal generator circuitry such as a pulse generator that supplies control signals to inverter 61. These control signals cause inverter 61 to create impulses so that impulse responses can be measured by circuitry 41 (e.g., by using a voltage sensor, an analog-to-digital converter configured to convert analog voltage measurements to digital voltage measurements, and/or other sensing circuitry). Measurement circuitry may also have alternating-current sources and other circuitry for making measurements on coil 36.

In some embodiments, quality-factor measurements are made on coil 36 to determine whether a foreign object is present. For example, direct impedance measurements and/or impulse responses can be analyzed to make quality-factor (Q-factor) measurements on coil 36. Measurements of the Q-factor of coil 36 (including measurements of changes in the Q-factor value from a baseline value) may be performed at any suitable time such as prior to transmitting wireless power from device 12 to device 24. If the Q-factor value deviates by more than a threshold amount and the object causing the Q-factor deflection does not respond to a subsequent digital ping, device 12 can conclude that a foreign object is present on coil 36 and can forgo wireless power transmission and/or take other suitable action (e.g., by transmitting power at a restricted level that is lower than the level permitted in absence of detecting the foreign object, by halting power transmission, etc.).

Figure 2:
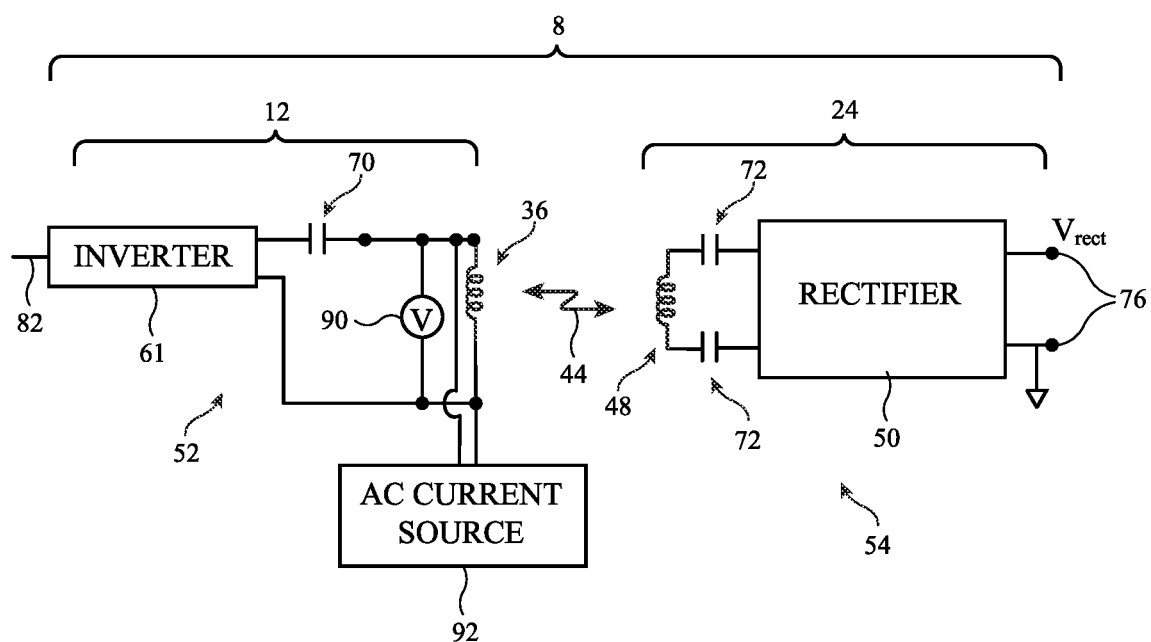
FIG. 2 is a circuit diagram of an illustrative wireless power system in accordance with an embodiment.

FIG. 2 shows illustrative circuitry in system 8 that allows measurements to be made of the Q-factor (Q) of coil 36. The wireless power circuitry of FIG. 2 includes wireless power transmitting circuitry 52 in wireless power transmitting device 12 and wireless power receiving circuitry 54 in wireless power receiving device 24. During operation, wireless power signals 44 are transmitted by wireless power transmitting circuitry 52 and are received by wireless power receiving circuitry 54. As shown in FIG. 2, wireless power transmitting circuitry 52 includes inverter circuitry 61.

Inverter circuitry (inverter) 61 may be used to provide signals to coil 36. During wireless power transmission, the control circuitry of device 12 supplies signals to control input 82 of inverter circuitry 61 that cause inverter 61 to supply alternating-current drive signals to coil 36. Circuit components such as capacitor 70 may be coupled in series with coil 36 as shown in FIG. 2. When alternating-current current signals are supplied to coil 36, corresponding alternating-current electromagnetic signals (wireless power signals 44) are transmitted to nearby coils such as illustrative coil 48 in wireless power receiving circuitry 54. This induces a corresponding alternating-current (AC) current signal in coil 48. Capacitors such as capacitors 72 may be coupled in series with coil 48. Rectifier 50 receives the AC current from coil 48 and produces corresponding direct-current power (e.g., direct-current voltage Vrect) at output terminals 76. This power may be used to power a load.

Device 12 may have measurement circuitry for monitoring signals on coil 36. This circuitry may include, for example, voltage sensor 90 (e.g., a voltage sensing circuit coupled to and/or formed as part of an analog-to-digital converter, etc.). Current-source 92 and/or inverter 61 may be also be used to supply signals to coil 36 during foreign object detection operations (e.g., so that Q may be measured for coil 36). In some embodiments, Q-factor measurements are made using direct measurement of impedance of coil 36 with an AC current source. Measurements of Q may be made in the presence of wireless power receiving device 24 and in the absence of any wireless power receiving devices (e.g., periodic free-air Q measurements may be made when device 24 is not present). By monitoring changes in Q from its free-air value, the presence of a foreign object can be detected and appropriate action taken.

With a first illustrative Q-factor measurement arrangement, the control circuitry of device 12 cause inverter 61 to provide signal pulses to coil 36 and measurement circuitry such as voltage sensor 90 is used to measure corresponding impulse responses. Due to resonance in the circuit of FIG. 2, application of a signal pulse to coil 36 creates a ringing signal with a decay envelope such a decay envelope 94 of FIG. 3. The decay envelope has a characteristic given by $e^{-t\pi fr/Q}$, where fr is the frequency of the ringing signal. By measuring fr and decay envelope 94, the value of Q can be determined.

If desired, capacitor 70 of FIG. 2 may be implemented using an adjustable capacitor arrangements (e.g., a capacitor circuit with switching circuitry and multiple capacitors that can be selectively switched into use under control of control circuitry 16 to adjust the capacitance value in the resonant circuit and thereby adjust the resonant frequency). In arrangements in which capacitor 70 has a selectable value, a first value (e.g., C1) can be used when the impulse response of the wireless power transmitting circuitry is being measured to determine Q (as described in connection with FIG. 3) and a second value (e.g., C2) can be used when the wireless power transmitting circuitry is transmitting wireless power signals 44.

Figures 4, 5:
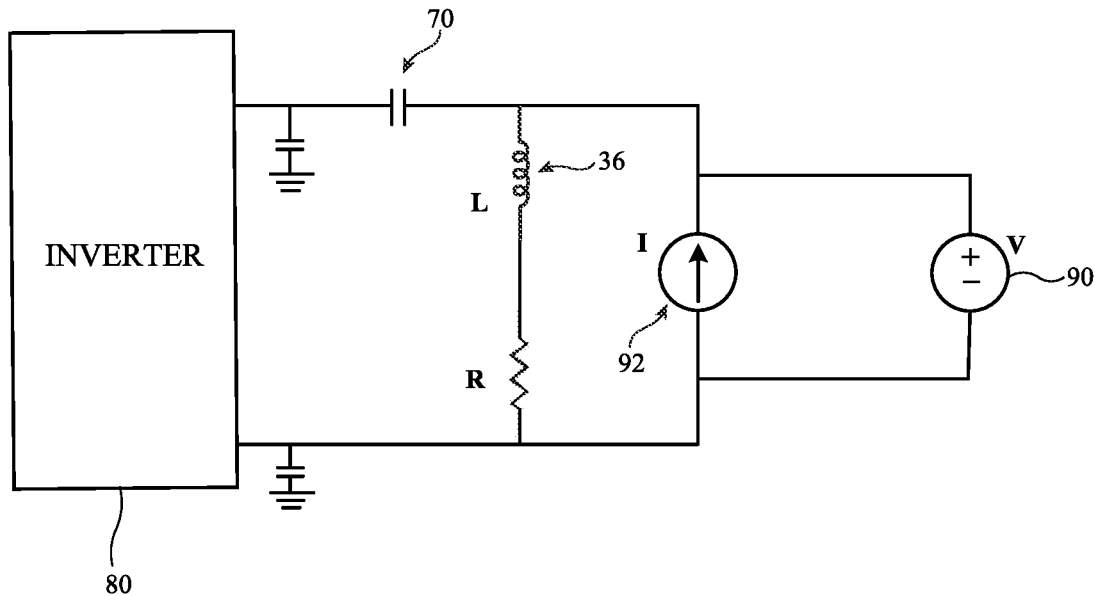
FIG. 4 is a circuit diagram of an illustrative wireless power transmitter showing circuitry that may be used to make quality-factor measurements in accordance with an embodiment.
FIG. 5 shows equations that may be used in determining parameters such as a coil quality-factor based on impedance measurements in accordance with an embodiment.

With a second illustrative Q-factor measurement arrangement, the value of Q is obtained from a direct measurement of the impedance of coil 36. FIG. 4 is a circuit diagram of wireless power transmitting circuitry and measurement circuitry of FIG. 2, showing how a parasitic resistance R may be associated with the resonant circuit. With the direct impedance measurement approach, a small current is injected into coil 36 from current source 92 while voltage measurements are made using voltage sensor 90. The magnitude of the injected current may be sufficiently low to allow the current to be injected without using large power field-effect transistors. The current may be, for example, an alternating-current (AC) current at a frequency such as 125 kHz, more than 125 kHz, or less than 125 kHz, or other suitable frequency (e.g., a frequency that can be selected independent of the resonant frequency associated with the wireless power transmitting circuit). The complex impedance of coil 36 is then determined at this frequency and the value of Q inverted from the angle θ of the measured impedance. FIG. 5 shows equations associated with the determination of Q (coil Q-factor) from the angle of the complex impedance and optional values of inductance L and resistance R (the real part of the AC impedance) that may be computed from the direct impedance measurement. In the equations of FIG. 5, I is the injected AC current and V is the resulting voltage that is measured by voltage sensor 90.

Measurement circuitry 41 of device 12 can be calibrated during manufacturing. For example, the value of Q-factor ($Q_0$) that is measured at an initial time when device 12 is being manufactured (using the first illustrative Q-factor measurement arrangement, the second illustrative Q-factor measurement arrangement, and/or additional Q-factor measurement techniques) can be stored in device 12 as a baseline value for later use. If desired, device-specific calibration operations may be performed so that each device 12 is individually calibrated with a corresponding individual baseline value of Q. When device 12 is operated in the field, device 12 can measure the present value of Q and can compare this measured value of Q to the stored baseline value of $Q_0$ from the factory. In this way, the amount of change in Q can be determined, which is indicative of whether a foreign object or other external object is present on the charging surface of device 12.

If desired, compensation techniques may be used to compensate for the effects of temperature, aging, and other effects that can induce drift in Q. Temperature variations can affect the parasitic resistance of components such as coil 36. Coil inductance L can also depend on temperature. Frequency changes and aging effects (e.g., mechanical wear) can affect component values and therefore the measured value of Q as well. Compensating for these effects when comparing Q to $Q_0$ can help enhance the accuracy of foreign object detection measurements.

The value of baseline Q-factor $Q_0$ and the value of resonant frequency ω ($2\pi fr$) that are measured during calibration (e.g., at an initial time during manufacturing) are given by equations 1 and 2.

$$Q_0 = \omega_0 L_0 / R_0(\omega_0) \qquad (1)$$

$$\omega_0 = 1/(L_0 C)^{1/2} \qquad (2)$$

The values of Q and ω (and of L and R) that are measured at runtime (sometimes referred to as current Q, current ω, current L and current R) are given, respectively, by $Q_{FO}$, $\omega_{FO}$, $L_{FO}$, and $R_{FO}$ of equations 3, 4, 5, and 6.

$$Q_{FO} = \omega_{FO} L_{FO} / R_{FO}(\omega_{FO}) \qquad (3)$$

$$\omega_{FO} = 1/(L_{FO} C)^{1/2} \qquad (4)$$

$$L_{FO} = L_0 + \Delta L_{FO} \qquad (5)$$

$$R_{FO} = R_0 + \Delta R_{FO} \qquad (6)$$

During compensation operations, the current temperature T of device 12 is measured using temperature sensor 60 of device 12 (see, e.g., FIG. 1). The change in temperature ΔT from the temperature T0 measured during calibration measurements during manufacturing is given by equation 7.

$$\Delta T = T - T0 \qquad (7)$$

The equation of FIG. 6 shows how a compensated value of Q (e.g., the value of Qcomp) can be determined as a function of the currently measured Q-factor (Q' in the equation of FIG. 6) based on one or more compensation factors.

A first illustrative compensation factor involves frequency compensation. As shown in the equation of FIG. 6, Q' can be multiplied by compensation factor (ω0/ω) to compensate for changes in resonant frequency during measurement of Q' relative to the resonant frequency during measurement of Q0 during manufacturing.

A second illustrative compensation factor relates to the temperature dependence of inductance and resistance. As shown in the equation of FIG. 6, Q' can be multiplied by the compensation factor (1+κRΔT)/(1+κLΔT), where κR is the resistive temperature change coefficient and κL is the inductive temperature change coefficient. The values of these temperature coefficients are influenced by the design of device 12 and may, if desired, be determined empirically by performing measurements on one or more representative units of wireless power transmitting device 12 during manufacturing.

A third illustrative compensation factor involves compensating for shifts in the AC resistance RAC of coil 36 and DC resistance RDC of coil 36 from baseline values. With this resistance-compensation technique, the current value of the quality factor is compensated based on a compensated value of the entire (total) inductive coil resistance associated with wireless power transmitting coil 36. Coil 36 is characterized by an entire inductive coil resistance value having direct-current and alternating-current portions. During compensating operations, control circuitry 16 compensates for changes in the entire inductive coil resistance by computing a compensated value of the entire inductive coil resistance from a sum of a baseline direct-current portion of the entire inductive coil resistance that was measured at an initial time and the current alternating-current portion of the entire coil resistance. This compensated entire inductive coil resistance value is then used in compensating the current quality factor using the compensated entire inductive coil resistance.

As shown in the equation of FIG. 6, the resistance-based compensation factor is based on the measured baseline DC resistance ($R_{DC,0}$) that was obtained during calibration measurements during manufacturing, the baseline AC resistance ($R_{AC}$) that was obtained during calibration measurements during manufacturing, and the value of $\eta$, which is the coefficient of change in AC resistance $R_{AC}$ as a function of changes in resonant frequency $\omega$ (e.g., 50 m-$\Omega$ per 100 kHz or other suitable value) that was obtained during calibration measurements during manufacturing. The parameter $R^{meas}$ is equal to the sum of the measured AC resistance $R_{AC}$ and measured DC resistance $R_{DC}$.

In the example of FIG. 6, all three of these illustrative compensation factors have been applied to the measured Q' value (e.g., Qcomp has been determined by compensating Q' based on changes in frequency and frequency-change-induced effects and for temperature-change-induced effects). In general, one or two of these compensation techniques may be used and/or other compensation techniques may be used to calibrate Q-factor measurements based on measured temperature, resonant frequency, and/or other variables.

As set forth in the foregoing example, a compensated Q-factor value Qcomp may be produced based on measurements of temperature and frequency. This value can then be compared to a baseline value of Q that was measured during manufacturing and stored in device 12 for use during later comparisons. If desired, compensation operations may be performed on the baseline Q-factor value to produce a compensated baseline Q rather than performing compensation operations on the in-field measured value of Q. Approaches in which compensation operations are performed on an in-field measured Q value rather than on baseline Q value are described herein as an example.

Figure 7:
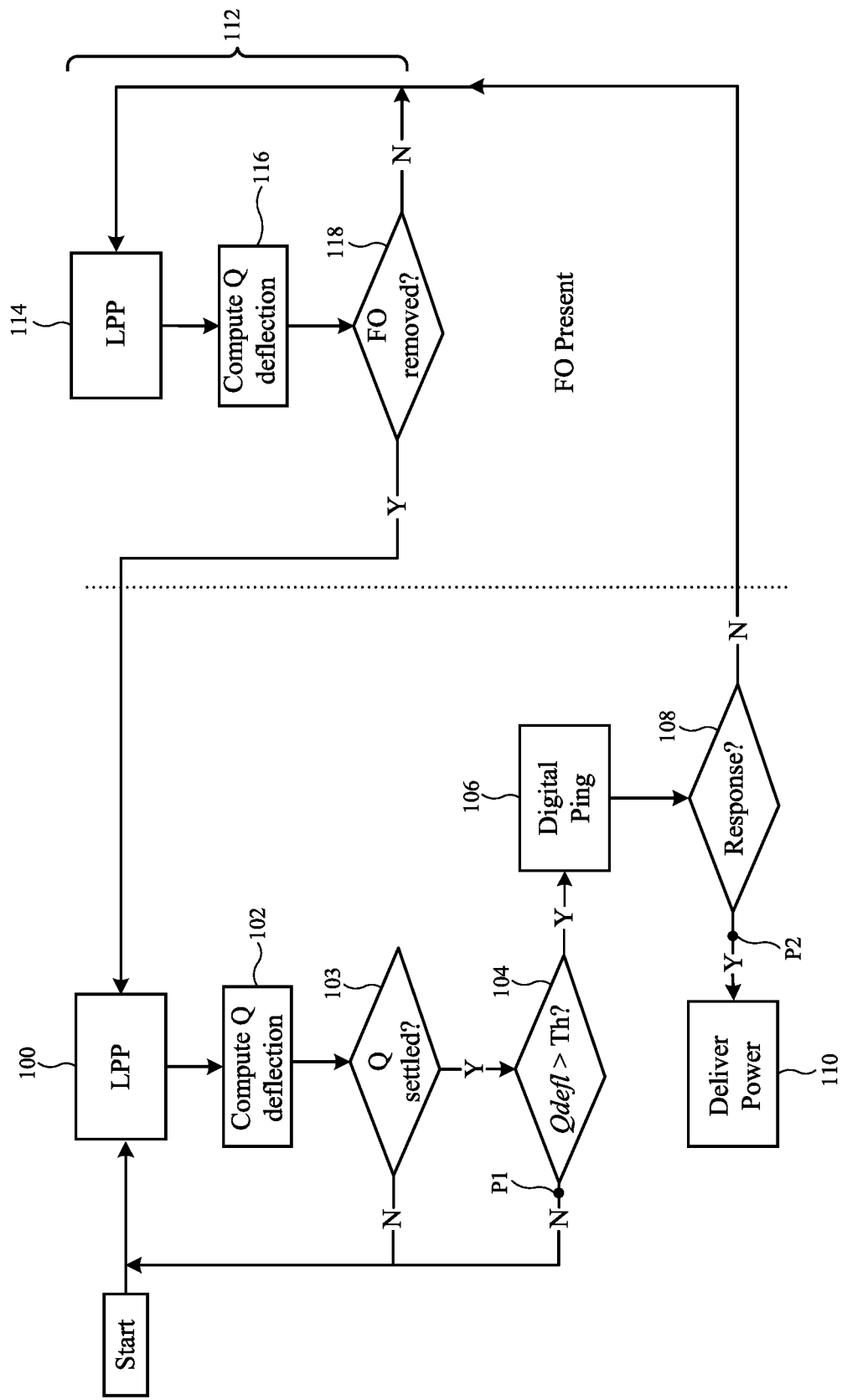
FIGS. 7 and 8 are diagrams showing illustrative operations involved in using a wireless power system in accordance with embodiments.

A flow chart of illustrative operations for detecting foreign objects using system 8 is shown in FIG. 7. In this embodiment, power delivery is inhibited if a foreign object is detected. It is also possible to simply flag the detection of the foreign object for use as additional information in determining appropriate power delivery levels during the power delivery phase. As an example, the maximum power level that is used during power delivery operations may be lowered to a predetermined level that is below the maximum power level in response to detection of the presence of the foreign object.

During the operations of block 100, device 12 measures a current value of Q using the first illustrative Q-factor measurement arrangement (e.g., using inverter 61 to apply an impulse and measuring Q from envelope 94 of the impulse response) or the second illustrative Q-factor measurement arrangement (e.g., deriving Q from a direct impedance measurement of coil 36 performed by injecting current into coil 36 using AC current source 92). The measurement of Q using techniques such as these or other suitable Q-factor measurement techniques may sometimes be referred to as a low-power ping (LPP) or analog ping operation.

During the operations of block 102, the value of the change in Q (e.g., Q-factor deflection value Qdefl) can be determined. During the operations of block 102, compensation techniques such as the compensation techniques described in connection with FIG. 6 can be applied to compensate the measured value of Q or the baseline value of Q ($Q_0$) that was stored in device 12 during manufacturing may be compensated. The value of Qdefl may, as an example, be computed using equation 8.

$$Q\text{defl}=(Q_0-Q_{comp})/Q_0=1-(Q\text{comp}/Q_0) \quad (8)$$

In the example of equation 8, Qdefl is computed based at least partly on a difference between compensated measured Q (Qcomp) and baseline Q ($Q_0$) and on a ratio between Qcomp and $Q_0$. With equation 8, if the current value of Q drops by 5% relative to baseline $Q_0$, Qdefl will be 5%. In general, Qdefl may be based only on a difference between measured Q and baseline Q, may be based only on a ratio between measured Q and baseline Q, may be based on both a difference between measured and baseline Q and a ratio between measured Q and baseline Q, and/or may be based on other functions of measured Q and baseline Q. The measured value of Q that is used in computing Qdefl may be compensated for temperature, frequency, and aging effects and/or the baseline value of Q may be compensated for temperature, frequency, and aging effects as described in connection with the compensation techniques of FIG. 6.

During the operations of block 103, the control circuitry of device 12 determines whether Q has settled. If Q is changing rapidly (e.g., due to movement of an external object across the charging surface of device 12 as measurements are being made), the value of Qdefl has not settled sufficiently and operations may return to block 100. A new measurement of Q may then be obtained during the operations of block 100. So long as Q hasn't settled, a new Q measurement may be obtained in this way each 0.1 s (or at another suitable sampling rate). Once successive values of Qdefl have changed by less than a predetermined threshold amount (e.g., 1%), Q can be deemed to have settled sufficiently to permit analysis of the value of Qdefl to determine whether a foreign object is present and operations may proceed to block 104.

During the operations of block 104, device 12 compares the value of Qdefl to a predetermined threshold value TH (e.g., 3% or other suitable value). If Qdefl does not exceed the threshold (e.g., if the measured value of Q has not been reduced by more than 3% relative to baseline Q), device 12 can conclude that no external object is present (e.g., wireless power receiving device 24 is not present and no coins or other foreign objects are present). Measurement operations may then continue at block 100. If, however, it is determined during the operations of block 104 that Qdefl exceeds the threshold, device 12 can conclude that measured Q has been reduced by more than the threshold amount relative to baseline $Q_0$ (e.g., Q is at least 3% lower than $Q_0$) and that therefore an external object of some type is present (either a foreign object such as a coin or wireless power receiving device 24). Operations may then proceed to block 106 to distinguish between these two possibilities.

During the operations of block 106, device 12 can attempt to wirelessly communicate with wireless power receiving device 24. As an example, device 12 may use in-band communications to transmit a wireless digital request. The wireless digital request is used to request that device 24 acknowledge its presence by using in-band communications to wirelessly transmit a corresponding digital response device 12. This digital communications request process may sometimes be referred to as a digital ping. During the operations of block 108, device 12 determines whether a response to the digital ping has been received from device 24 to indicate that device 24 is present.

If device 24 is present on the charging surface of device 12, device 24 will respond to the digital ping with a wireless digital response. This response may include information such as a digital identifier corresponding to the type of device 24 that is present, etc. In response to determining, during the operations of block 108, that a cellular telephone, wristwatch, or other wireless power receiving device 24 is present, device 12 will transmit wireless power signals 44 to device 24 (e.g., during the operations of block 110).

If, device 24 is not present on the charging surface of device 12, device 12 will not receive any acknowledgement from device 24. In response to determining, during the operations of block 108, that device 24 is not present, device 12 can conclude that a foreign object is present at the charging surface of device 12 and operations can proceed to blocks 112.

During blocks 112, device 12 monitors Q to determine when the foreign object that is present has been removed. In particular, Q is measured during the operations of block 114, as described in connection with the Q measurements of block 100. The value of Qdefl is computed at block 116. The operations of block 118 involve comparing Qdefl to threshold TH or another threshold. If the foreign object remains present, Qdefl will remain at a value that exceeds the threshold and additional measurements may be performed at block 114. If, however, the foreign object is removed, processing will return to block 100, so that device 12 can determine whether device 24 is present and, if so, can begin delivering wireless power to device 24.

In determining Qdefl, device 12 performs comparisons of measured Q to the baseline value of Q that was obtained during manufacturing and stored in device 12 for future use. Temperature changes, frequency changes, coil resistance changes, and other changes can affect Qbaseline, so, if desired, Qbaseline can be continually updated. With an illustrative arrangement, a filter is used in updating Q baseline based on a newly measured Q reading each time it is determined that there are no external objects present at the charging surface of device 12. For example, each time device 12 determines, during the operations of block 104, that Qdefl is not greater than the threshold, device 12 can conclude that there are no foreign objects and no wireless power transmitting devices present on the charging surface. Accordingly, device 12 can conclude that the most recent measurement of Q from block 100 is, in effect, an updated value that can be at least partly used in updating Qbaseline (e.g., a current Q value that can be used as a filter input).

With this embodiment, an updated value of Qbaseline can therefore be stored in device 12 at point P1 of the flow chart of FIG. 7 each time it is determined that Qdefl is not greater than threshold TH. In updating Qbaseline, the current value of Q (measured during the most recent visit to block 100) can be incorporated into Qbaseline using a suitable filtering scheme (e.g., using a weighted historical average, using an averaging scheme that deemphasizes noisy data, or other filtering arrangement). By updating Qbaseline with current measurement data in this way, the effects of aging on the baseline Q value can be reduced.

With an illustrative configuration, device 12 updates Qbaseline with the current value of measured Q using a low-pass filter. Let q[n] be a valid Q deflection sample. An example of a low-pass filter for Q is a one-pole filter (see, e.g., equation 9) in which $\alpha \in [0,1]$ and close to 1.

$$Q_{filt}[n] = \alpha Q_{filt}[n-1] + (1-\alpha) Q_{defl}[n], Q_{filt}[0]=0 \qquad (9)$$

Another example is the sliding window average given in equation 10.

$$Q_{filt}[n] = \begin{cases} \sum_{m=0}^{n} Q_{defl}[m] & \text{for } n < M \\ \sum_{m=n-M}^{n} Q_{defl}[m] & \text{for } n \geq M \end{cases} \qquad (10)$$

As these examples demonstrate, there are multiple possible arrangements for incorporating current Q measurement data from block 100 into the baseline Q value that is retained in device 12 and that is subsequently used in computing Qdefl. In these updating operations, control circuitry 16 periodically updates the baseline quality factor using a filtering operation based on a history of current quality factor measurements, thereby ensuring that the value of the baseline quality factor is adjusted for aging and other effects that could cause quality factor measurements to drift over time.

Updating the baseline Q value at point P1 involves performing a separate filtering operation following each measurement of Q at block 100. If desired, the number of filtering operations per unit time (and therefore the number of times that an updated value of Q baseline is computed and stored in device 12 per unit time) can be reduced by performing filtering operations at point P2 instead of P1. With this type of arrangement, the values of Q that are measured during the operations of block 100 are stored (cached) by control circuitry 16 each time point P1 is reached (e.g., each time it is determined that no foreign object is present). If the operations of block 104 determine that the latest Q value exceeds threshold TH, processing proceeds to block 106 where a digital ping is performed. During the operations of block 108, control circuitry 16 determines whether a) no response has been received corresponding to the digital ping (in which case a foreign object is present and processing proceeds to blocks 112) or whether b) a wireless digital response has been received from device 24. At this point (e.g., at point P2), device 12 knows that device 24 has just been placed on the charging surface of device 12. Before initiating power delivery at block 110, device 12 retrieves that last value of Q that was cached at point P1 (and which represents a Q factor measurement when no foreign object or other external object is present on device 12) and uses this retrieved current value of Q to update the value of Q baseline.

With this approach, the filtering operation used to update Q baseline is performed only upon determining that a wireless power receiving device is newly present (and no foreign object is present). The filtering operation is performed using the most recently obtained value of Q when no external object was present (e.g., the no-external-object present value of Q that was cached at point P1). There is still a Q value storage operation each time point P1 is reached, but computation of the updated baseline Q value using the filter is performed less frequently (e.g., only when P2 is reached). Updating the baseline Q value only when it has been determined that no wireless power receiving device is present and no foreign object is present ensures that value of the baseline quality factor is adjusted for aging and other effects that could cause quality factor measurements to drift over time, but does not involves as many separate filtering operations as when filtering operations are performed at point P1.

In addition to periodically updating the baseline value of Q (either at point P1 or at point P2, as examples), control circuitry 16 may periodically update the value of threshold TH that is used during the comparison operations of block 104 (e.g., an adjustable threshold value TH may be used rather than a fixed predetermined value). For example, a low-pass filtering operation or other filtering operation may be used to update the value of TH based on a history of Q factor measurements or other measurements (e.g., Q factor measurements made when no external object is present and cached at point P1). This filtering operation to update the value of TH may be performed at point P2 (e.g., upon determining that no foreign object is present), using measurements such as one or more cached Q factor measurements made when no wireless power receiving device or foreign object was present.

If desired, the value of Qdefl may be compared to multiple different thresholds (e.g., to determine whether a small or large foreign object is present). Device 12 can then take different actions depending on whether a small or large foreign object is present. For example, wireless power can be transmitted at a restricted power level if a small foreign object is detected in the presence of a wireless power receiving device but can be forgone entirely in the presence of a large foreign object.

Figure 8:
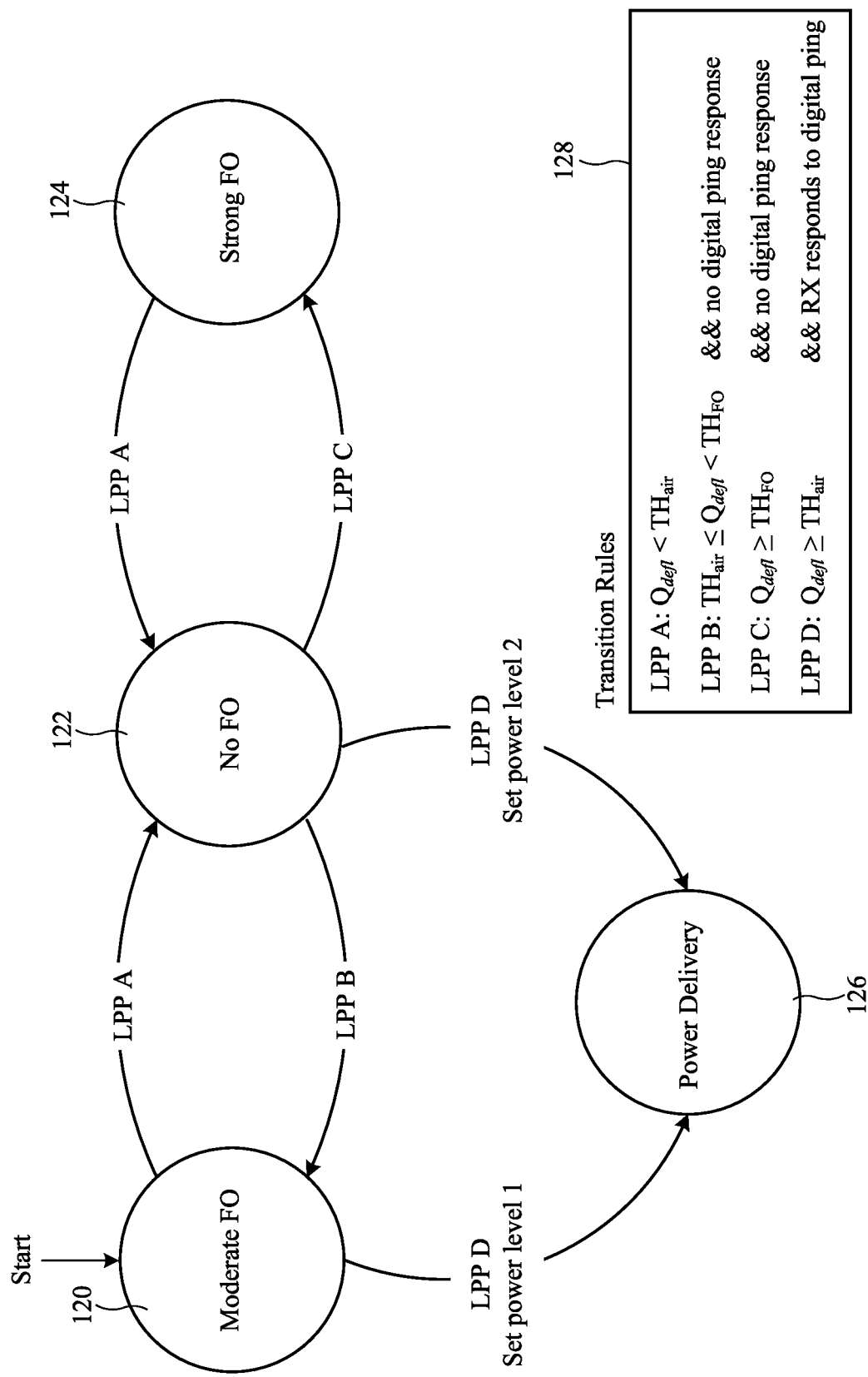

Consider, as an example, the diagram of FIG. 8, which illustrates the operation of device 12 in a system with multiple foreign object detection thresholds. In the example of FIG. 8, system 8 has a lower first threshold THair (e.g., 3% or any other suitable value such as a value less than 3% or a value greater than 3%) and a higher second threshold THfo (e.g., 6%, a value above or below 6%, or any other suitable value higher than the first threshold). Device 12 operates in states 120, 122, 124, and 126. Transitions are made between these states in accordance with transition rules 128. The values of thresholds THair and THfo can be adjusted appropriately to distinguish a moderate foreign object (e.g., an object with a relatively small amount of metal and/or metal of moderate conductivity) from a strong foreign object (e.g., an object with more metal and/or metal of greater conductivity). Power will be inhibited in the case of a strong foreign object until free air is seen. However, by setting the threshold high enough, implementations can opt to avoid using the "strong foreign object" state.

As shown in FIG. 8, in block 122, device 12 has compared Qdefl to the first and second thresholds and has determined that Qdefl is lower than the first threshold. In this scenario, device 12 can conclude that no foreign object is present and can therefore set the power delivery level for wireless power signals 44 at a relatively high power level (power level 2). Power can then be wirelessly transmitted from device 12 to device 24 during the power delivery operations of block 126.

In block 120, it has been determined that a foreign object is present because Qdefl is greater than the first threshold. It has also been determined that Qdefl is less than the second threshold. As a result, device 12 can conclude that although a foreign object is present, it is not a large foreign object. Device 12 can therefore proceed to deliver power wirelessly to device 24 during the operations of block 126. Because power is being delivered to device 24 in the presence of a small foreign object, the level (e.g., the maximum level) at which power is wirelessly transmitted is reduced to a relatively low power level (e.g., power level 1, which is less than power level 2). This helps prevent excess heating of the small foreign object.

In block 124, it has been determined that a large foreign object is present, because Qdefl is greater than the second threshold. In this situation, no wireless power is transmitted by device 12.

The following section further describes the foregoing embodiments.

This section describes an accurate, pre-wireless power transfer foreign object detection (FOD) technique that is useful for detecting foreign objects placed on device 10 (e.g., a PTx mat, sometimes referred to as PTx) prior to the arrival of device 24 (e.g., a portable device or other power receiving device sometimes referred to as PRx). This technique addresses several challenges:

1. Mated-Q foreign object detection (FOD) has trouble distinguishing between foreign objects (FOs) and alignment offsets between PRx and PTx. This is due to the fact that the reference Q is computed as the average of the mated-Q at predetermined (e.g., five) different positions rather than being stored as a function of position which cannot easily be determined at run-time. There are other potential challenges with mated-Q:
   a. It relies on a reference measurement for Q that is measured at 100 KHz. The in-system frequency may be different. Since the inductance, L, is a function of frequency, this difference in frequency can lead to a discrepancy in Q measured at run-time compared to the calibrated Qref.
   b. It doesn't account for capacitor ESR when non-COG capacitors are used), PCB trace resistance and FET Rds(on) resistance.
   c. It doesn't account for temperature or frequency drift.
   d. The reference Q is measured against the TPR which may have different deflections on Q from other transmitters.

A general flow for open-air Q testing which conveys the general concept is shown in FIG. 7. During the start-up phase (block 100), the PTx uses analog ping to detect objects placed on the mat. The ping is used to measure a deflection to Q defined as:

$$\Delta Q = 1 - \frac{Q}{Q_0} \tag{11}$$

where $Q_0$ is the calibrated value for open-air Q measured at production and Q is measured by analog ping at run-time (see, e.g., Q deflection computation at block 102 and the operations waiting for Q to settle of block 103). Note that $\Delta Q \approx 0$ if there is no FO present, but often it is not exactly zero because of effects such as temperature drift. Component aging will also cause $\Delta Q \neq 0$.

When an object is placed on the mat, the Q will be deflected by some amount. If $\Delta Q$ (sometimes referred to as Qdefl) exceeds a threshold, something is detected. In some implementations the absolute value ($|\Delta Q|$) is compared against a threshold (block 104) to account for the presence of a very high-Q receiver that is placed on the PTx mat. To determine if that something is an FO or a receiver, a response from digital ping is awaited (block 106). In the case digital ping is acknowledged, the system can proceed to negotiation. If it is not, the object is presumed to be an FO and power delivery is blocked until the FO is removed from the mat and $\Delta Q \approx 0$ again.

There are many approaches for measuring Q such as:
1. Perform a frequency sweep to find the resonance frequency, then compute Q as the ratio of the tank voltage over the inverter voltage at the resonance frequency.
2. Use an LCR meter connected directly to the coil to measure L and Q at a specific frequency.

It is possible to perform the Q measurement in other ways as well.

Figure 3:
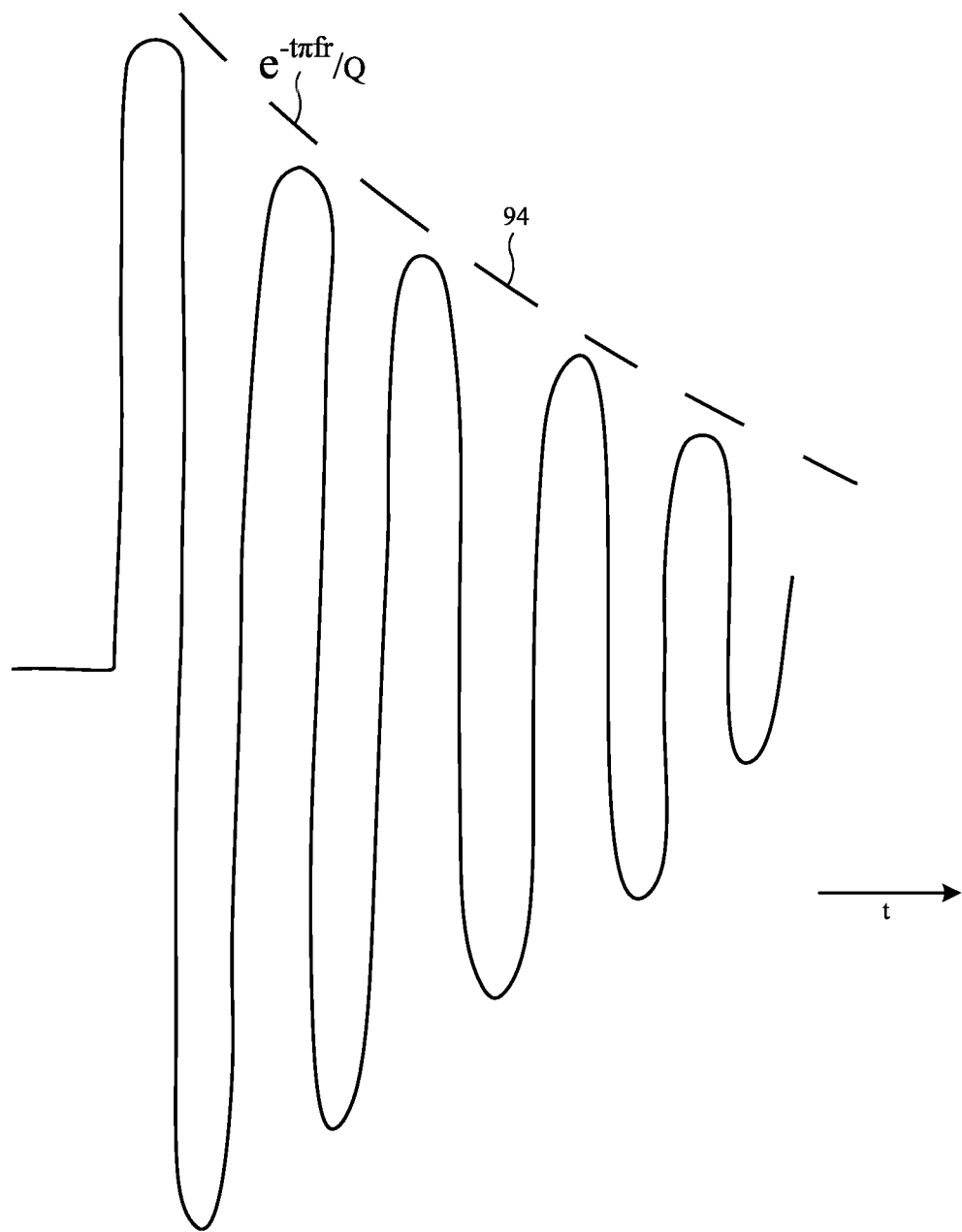
FIG. 3 is a graph showing the impulse response of a wireless power transmitting coil can be analyzed to measure a quality-factor value for the coil in accordance with an embodiment.

As a first example, Q may be estimated from the decay of the ringing response. In this approach, a pulse of energy is injected into the coil and the decay of the ringing response is measured as illustrated in FIG. 3. Q is then estimated from the decay envelope.

Figure 9:
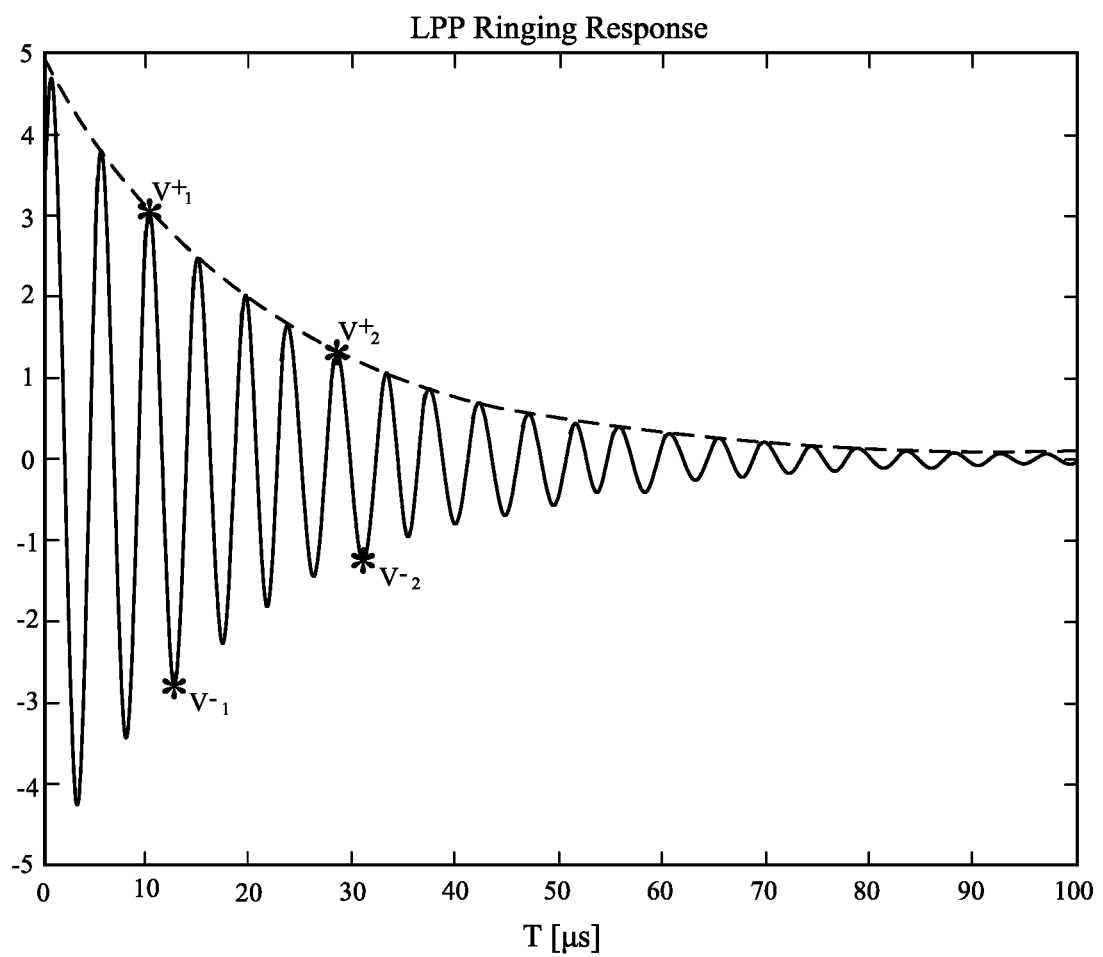
FIG. 9 is a graph showing the impulse response of a wireless power transmitting circuit in accordance with an embodiment.

Estimating Q requires accurate sampling of the waveform peaks to obtain its envelope. To eliminate the impact of the DC offset, b, from the decay estimate, it is recommended that the envelope amplitude be measured as the peak-to-valley difference as shown in FIG. 9.

That is, define $$V_i = V_i^+ - V_i^-, i = 1, 2 \quad (12)$$

then $$Q_{est} = \frac{\pi N}{\log\left(\frac{V_1}{V_2}\right)} \quad (13)$$

where N is the separation (in terms of number of peaks) between the second samples and the first samples (N=1 means the peaks are adjacent).

This approach is affected by frequency drift caused, primarily, from changes in L due to the presence of an FO.

As a second example, Q is computed from a coil impedance measurement. In this approach, illustrated in FIG. 4, the coil Q is directly measured at a fixed frequency. This approach has the advantage of eliminating frequency drift from the Q measurement but requires protection from high voltages at the positive coil node.

An AC current, I, is injected into to the coil and the complex voltage is measured:

$$V = (j\omega L + R)I \quad (14)$$

The angle between V and I is $$\angle \frac{V}{I} = \tan^{-1} \frac{\omega L}{R} = \tan^{-1} Q \quad (15)$$

Therefore, $$Q = \tan\left(\angle \frac{V}{I}\right) \quad (16)$$

The phase angle between V and I can be determined by comparing the offsets in their peaks or zero-crossings or by taking the dot-product of the waveforms.

The presence of an FO causes a shift $\Delta L$ and $\Delta R$ of, respectively, L and R:

$$L_{FO} \triangleq L + \Delta L_{FO} \quad (17a)$$

$$R_{FO} \triangleq R + \Delta R_{FO} \quad (17b)$$

$$\omega_{FO} \triangleq \frac{1}{\sqrt{L_{FO} C}} \quad (17c)$$

This shift causes a change in Q, $$Q_{FO} = \frac{\omega_{FO} * L_{FO}}{R_{FO}} \quad (18)$$

which results in a measurable Q deflection, $$\Delta Q = \left|1 - \frac{Q_{FO}}{Q}\right| = 1 - \frac{\sqrt{\frac{L_{FO}}{L_0}}}{\left(\frac{R_{FO}}{R_0}\right)} \quad (19)$$

There may be an accentuation of Q deflection due to frequency drift caused by FO. In addition to measuring Q, it is possible to accurately measure the frequency of the ringing response. By (17c), the FO also deflects that ringing response. We can use this fact to accentuate the deflection in Q:

$$Q_{comp} \triangleq Q\left(\frac{\omega_0}{\omega}\right) \quad (20)$$

This results in an enhanced Q deflection in the presence, primarily, of a non-ferrous FO which causes a reduction in L, $$\Delta Q = 1 - \frac{Q_{comp}}{Q_0} = 1 - \frac{\left(\frac{L_{FO}}{L_0}\right)}{\left(\frac{R_{FO}}{R_0}\right)} \quad (21)$$

The result of equation (21) is greater than that of (19) when $\Delta L_{FO} < 0$.

This enhanced Q deflection does not apply to the approach of the second example of Q measurement which operates at a fixed frequency.

The value of Q can be compensated for drift. There are possibilities for improving the Q deflection measurement in some implementations. The Q deflection in equation (11) is intended to compare the run-time measurement of Q against the production calibrated measurement of Q. During run-time, effects besides the presence of an FO such as temperature and frequency drift can result in Q deflection. Compensating for these effects improves the reliability of the open-air Q test.

DC and AC resistances can be separated. Various drift effects in the measurement of Q occur to the DC portion of the resistance which, itself, is not affected by the presence of an FO. DC resistances include resistances from the PCB traces, capacitor ESR and inverter FET resistances. If we separate the DC resistance from the overall resistance, we can use the DC resistance calibrated at production and remove the impact of DC resistance drift. Specifically, let $$R = R_{DC}(T) + R_{coil,AC}(T, \omega) \quad (22)$$

where we've indicated that RDC is sensitive to temperature while $R_{coil,AC}$ is sensitive to temperature and frequency.

Using (22), Q can be written as $$Q = \frac{\omega L}{R} = \frac{\omega L}{R_{DC} + R_{coil,AC}} \quad (23)$$

The total resistance, R, can also be determined by the analog ping ringing response (or impedance measurement):

$$L = \frac{1}{(2\pi F_r)^2 C} \quad (24a)$$

$$R = \frac{(2\pi F_r L)}{Q} \quad (24b)$$

$$R_{coil,AC} = R - R_{DC} \quad (24c)$$

If we measure the DC resistance, we can store its value, RDC,0, at production and then compute Q at run-time as, $$Q_{comp} \triangleq \frac{\omega L}{R_{DC,0} + R_{coil,AC}} = Q \cdot \left(\frac{R}{R_{DC,0} + R_{coil,AC}}\right) \quad (25)$$

This effectively eliminates DC drift from the Q measurement at the cost of additional measurement error of the resistances.

As indicated in (22), the coil RAC may be a function of frequency, $$R_{coil,AC}(\omega) \approx R_{coil,AC,0}(1 + \eta \Delta \omega) \quad (26)$$

where $\Delta\omega \triangleq \omega - \omega 0$ is the change in frequency compared to the frequency measured at production and η is slope of the drift. Let, $$c_{F,R} \triangleq \frac{1}{1 + \eta \Delta \omega} \quad (27)$$

Then (25) can be furthered compensated for RAC frequency drift as follows:

$$Q_{comp} \triangleq Q \cdot \left(\frac{R}{R_{DC,0} + R_{coil,AC} \cdot c_{F,R}}\right) \quad (28)$$

If the design of the PTx dictates it, a frequency compensation for L can also be applied, $$Q_{comp} \triangleq Q \cdot c_{F,L} \text{ with } c_{F,L} = \frac{1}{1 + v\Delta\omega} \quad (29)$$

As indicated in (22), the coil RAC may be a function of temperature, $$R_{coil,AC}(\omega) \approx R_{coil,AC,0}(1 + \kappa_R \Delta T) \quad (30)$$

where ΔT=T−TO is the change in temperature compared to the temperature when the device was calibrated at production and κR is the coil resistance temperature coefficient. Assuming the PTx has a means for measuring the coil temperature, T, then the Q measurement can be further compensated for temperature as follows:

$$c_T \triangleq \frac{1}{1 + \kappa \Delta T} \quad (31)$$

$$Q_{comp} = Q \cdot \left(\frac{R}{R_{DC,0} + R_{coil,AC} \cdot c_{F,R} \cdot c_T}\right) \cdot c_{F,L} \quad (32)$$

Combining (20), (28) and (32), we have the following options for improving Q accuracy.

Q Measurement Approach 1

$$Q_{comp}^{-1} = Q \cdot \left(\frac{\omega_0}{\omega}\right) \cdot \left(\frac{R}{R_{DC,0} + R_{coil,AC}}\right) \cdot c_{F,L} \quad (33)$$

Q Measurement Approach 2

$$Q_{comp}^2 = Q \cdot \left(\frac{R}{R_{DC,0} + R_{coil,AC} \cdot c_T}\right) \quad (34)$$

Finally, we replace (11) with $$\Delta Q = 1 - \frac{Q_{comp}}{Q_0} \quad (35)$$

The sensitivity of Q deflection to an FO can also be plotted [using, for example, eqn. (21)] for specific PTx implementations. For example, assuming ΔLFO=0, ΔRFO=22mΩ we can see how ΔQ varies versus the coil resistance in FIG. 10.

Figure 10:
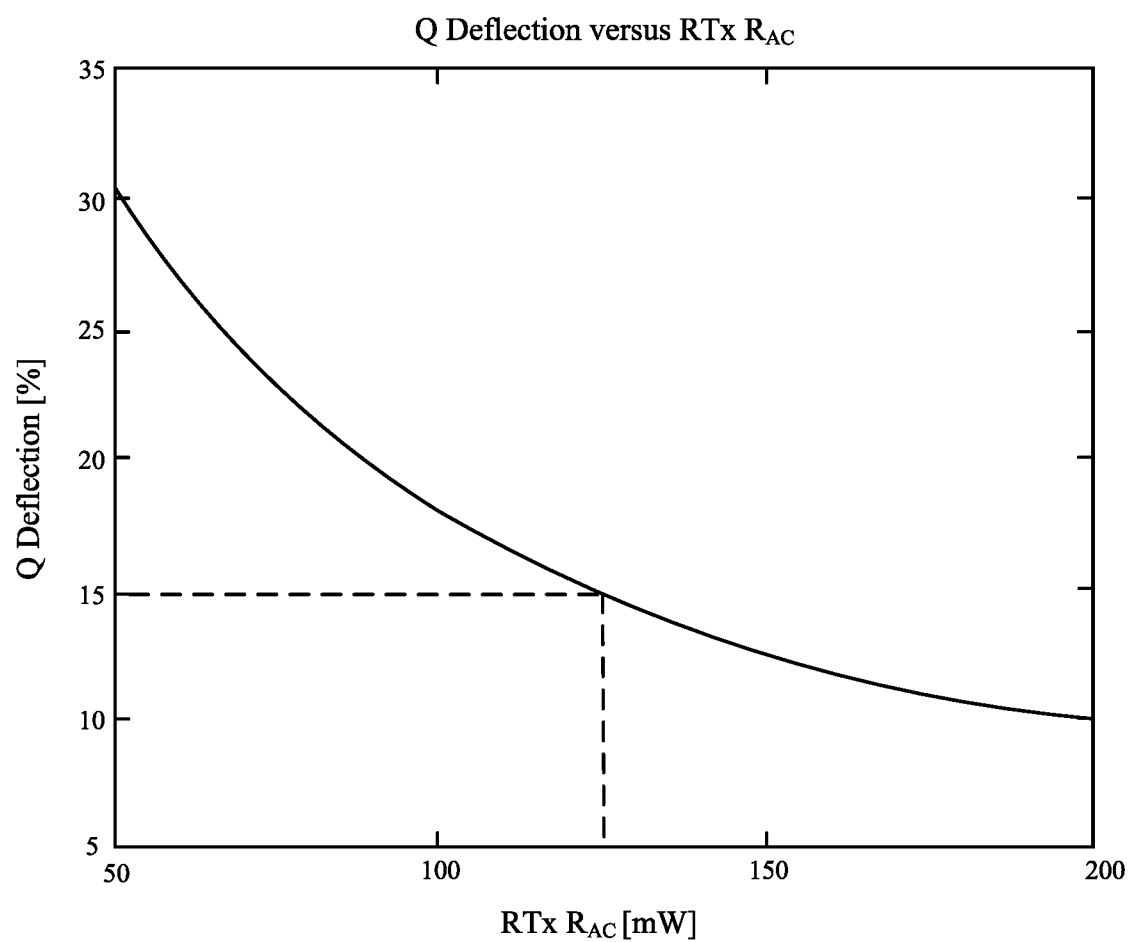
FIG. 10 is a graph in which change in quality factor has been plotted as a function of coil resistance in accordance with an embodiment.

FIG. 10 indicates that in order to achieve a Q deflection of 15%, the PTx AC resistance should be no more than 125Ω. If the PTx can measure Q more accurately, it can afford to have a higher AC resistance.

The foregoing is merely illustrative and various modifications can be made to the described embodiments. The foregoing embodiments may be implemented individually or in any combination.

What is claimed is:

1. A wireless power transmitter comprising:
    wireless power transmitting circuitry having a wireless power transmitting coil that transmits wireless power signals; and
    control circuitry coupled to the wireless power transmitting circuitry that:
        measures a present quality factor of the wireless power transmitting coil;
        determines a change between the measured present quality factor and a baseline quality factor;
        responsive to the change between the measured present quality factor and the baseline quality factor being less than a threshold, continues to measure the present quality factor of the wireless power transmitting coil and determine the change between the measured present quality factor and a baseline quality factor;
        responsive to the change between the measured present quality factor to the baseline quality factor exceeding the threshold, attempts to initiate digital communication with a wireless power receiver; and
        responsive to initiation of digital communication with the wireless power receiver, updates the baseline quality factor based on one or more recently measured present quality factors.

2. The wireless power transmitter of claim 1 wherein the control circuitry measures the present quality factor of the wireless power transmitting coil by:
- causing an inverter to provide one or more signal pulses to the wireless power transmitter coil;
- using measurement circuitry to measure responses to the provided one or more signal pulses, wherein the responses include a ringing signal with a decay envelope characterized by a frequency of the ringing signal and the present quality factor; and
- determining the present quality factor from the frequency of the ringing signal.

3. The wireless power transmitter of claim 2 wherein the change between the measured present quality factor and the baseline quality factor includes a ratio of the measured present quality factor to the baseline quality factor.

4. The wireless power transmitter of claim 2 wherein the change between the measured present quality factor and the baseline quality factor includes a difference between the measured present quality factor to the baseline quality factor.

5. The wireless power transmitter of claim 2 wherein determining the present quality factor from the frequency of the ringing signal includes comparing a peak to valley difference of the ringing signal on a first cycle of the ringing signal to a peak to valley difference of the ringing signal on a subsequent cycle of the ringing signal.

6. The wireless power transmitter of claim 2 wherein determining the present quality factor from the frequency of the ringing signal includes compensating for temperature effects.

7. The wireless power transmitter of claim 6 wherein compensating for temperature effects compensating for temperature effects on coil resistance.

8. The wireless power transmitter of claim 6 wherein compensating for temperature effects includes compensating for temperature effects on coil inductance.

9. The wireless power transmitter of claim 2 wherein determining the present quality factor from the frequency of the ringing signal includes compensating for frequency effects.

10. The wireless power transmitter of claim 9 wherein compensating for frequency effects includes compensating for a change in resonant frequency.

11. The wireless power transmitter of claim 2 wherein determining the present quality factor from the frequency of the ringing signal includes compensating for aging effects.

12. The wireless power transmitter of claim 11 wherein compensating for aging effects includes updating the baseline quality factor.

13. The wireless power transmitter of claim 2 wherein the control circuitry measures a present quality factor of the wireless power transmitting coil by:
- using measurement circuitry to measure a complex impedance of the wireless power transmitting coil; and
- determining the present quality factor from a phase angle of the complex impedance.

14. The wireless power transmitter of claim 1 wherein: the control circuitry is further configured to:
- the control circuitry determines that a foreign object is present in response to determining that the change between the measured present quality factor and the baseline quality factor exceeds the threshold;
- the control circuitry determines that no foreign object is present in response to determining that the change between the measured present quality factor and the baseline quality factor does not exceed the predetermined threshold; and
- the control circuitry updates the baseline quality factor based on one or more recently measured present quality factors only if no foreign object is present.

15. The wireless power transmitter of claim 14 wherein:
- the control circuitry inhibits power transfer in response to determining that the foreign object is present; and
- the control circuitry allows power transfer in response to determining that no foreign object is present.

16. The wireless power transmitter of claim 1 wherein the threshold comprises a first threshold and a second threshold higher than the first predetermined threshold and wherein:
- the control circuitry determines that unacceptable foreign object power loss is possible in response to determining that the change between the measured present quality factor and the baseline quality factor exceeds the second threshold;
- the control circuitry determines that acceptable foreign object power loss is possible in response to determining that the change between the measured present quality factor and the baseline quality factor exceeds the first threshold but does not exceed the second threshold;
- the control circuitry determines that no foreign object power loss is expected in response to determining that the change between the measured present quality factor and the baseline quality factor does not exceed the first threshold; and
- the control circuitry updates the baseline quality factor based on one or more recently measured present quality factors only if no foreign object is present.

17. The wireless power transmitter of claim 16 wherein:
- the control circuitry inhibits power transfer in response to determining that unacceptable foreign object power loss is possible;
- the control circuitry allows power transfer at a relatively lower power level in response to determining that acceptable foreign object power loss is possible; and
- the control circuitry allows power transfer at a relatively higher power level in response to determining that no foreign object power loss is expected.

18. The wireless power transmitter of claim 1 wherein the control circuitry measures a present quality factor of the wireless power transmitting coil by:
- using measurement circuitry to measure a complex impedance of the wireless power transmitting coil; and
- determining the present quality factor from a phase angle of the complex impedance.

19. A method of operating a wireless power transmitter having wireless power transmitting circuitry that includes a wireless power transmitting coil that transmits wireless power signals and control circuitry coupled to the wireless power transmitting circuitry, the method being performed by the wireless power control circuitry and comprising:
- measuring a present quality factor of the wireless power transmitting coil;
- determining a change between the measured present quality factor to a baseline quality factor;
- responsive to the change between the measured present quality factor and the baseline quality factor not exceeding a threshold, continuing to measure the present quality factor of the wireless power transmitting coil and determine the change between the measured present quality factor and the baseline quality factor;
- responsive to the change between the measured present quality factor and the baseline quality factor exceeding the threshold, attempting to initiate digital communication with a wireless power receiver; and responsive to initiation of digital communication with the wireless power receiver, updating the baseline quality factor based on one or more recently measured present quality factors.

20. The method of claim 19 wherein measuring a present quality factor of the wireless power transmitting coil further comprises:
   causing an inverter to provide one or more signal pulses to the wireless power transmitter coil;
   using measurement circuitry to measure responses to the provided one or more signal pulses, wherein the responses include a ringing signal with a decay envelope characterized by a frequency of the ringing signal and the present quality factor; and
   determining the present quality factor from the frequency of the ringing signal.

21. The method of claim 20 wherein determining the present quality factor from the frequency of the ringing signal includes comparing a peak to valley difference of the ringing signal on a first cycle of the ringing signal to a peak to valley difference of the ringing signal on a subsequent cycle of the ringing signal.

22. The method of claim 20 wherein determining the present quality factor from the frequency of the ringing signal includes compensating for temperature effects.

23. The method of claim 20 wherein determining the present quality factor from the frequency of the ringing signal includes compensating for frequency effects.

24. The method of claim 20 wherein determining the present quality factor from the frequency of the ringing signal includes compensating for aging effects.

25. The method of claim 19 further comprising:
   using measurement circuitry to measure a complex impedance of the wireless power transmitting coil; and
   determining the present quality factor from a phase angle of the complex impedance.

26. The method of claim 19 further comprising:
   determining that a foreign object is present in response to determining that the change between the present quality factor and the baseline quality factor exceeds the threshold;
   determining that no foreign object is present in response to determining that the change between the present quality factor and the baseline quality factor does not exceed the threshold; and
   updating the baseline quality factor based on one or more recently measured present quality factors only if no foreign object is present.

27. The method of claim 19 further comprising:
   inhibiting power transfer in response to determining that the foreign object is present; and
   allowing power transfer in response to determining that no foreign object is present.

28. The method of claim 19 the threshold comprises a first threshold and a second threshold higher than the first threshold and wherein the method further comprises:
   determining that unacceptable foreign object power loss is possible in response to determining that the change between the present quality factor and the baseline quality factor exceeds the second threshold;
   determining that acceptable foreign object power loss is possible in response to determining that the change between the present quality factor and the baseline quality factor exceeds the predetermined threshold but does not exceed the second threshold; determining that no foreign object power loss is expected in response to determining that the change between the present quality factor and the baseline quality factor does not exceed the first threshold; and updating the baseline quality factor based on one or more recently measured present quality factors only if no foreign object is present.

29. The method of claim 28 wherein further comprising: inhibiting power transfer in response to determining that unacceptable foreign object power loss is possible; allowing power transfer at a relatively lower power level in response to determining that acceptable foreign object power loss is possible; and allowing power transfer at a relatively higher power level in response to determining that no foreign object power loss is expected.

* * * * *